Sept. 18, 1951
E. NELSON
2,568,293
ICE CREAM DISPENSING MACHINE
Filed May 19, 1950
2 Sheets-Sheet 1
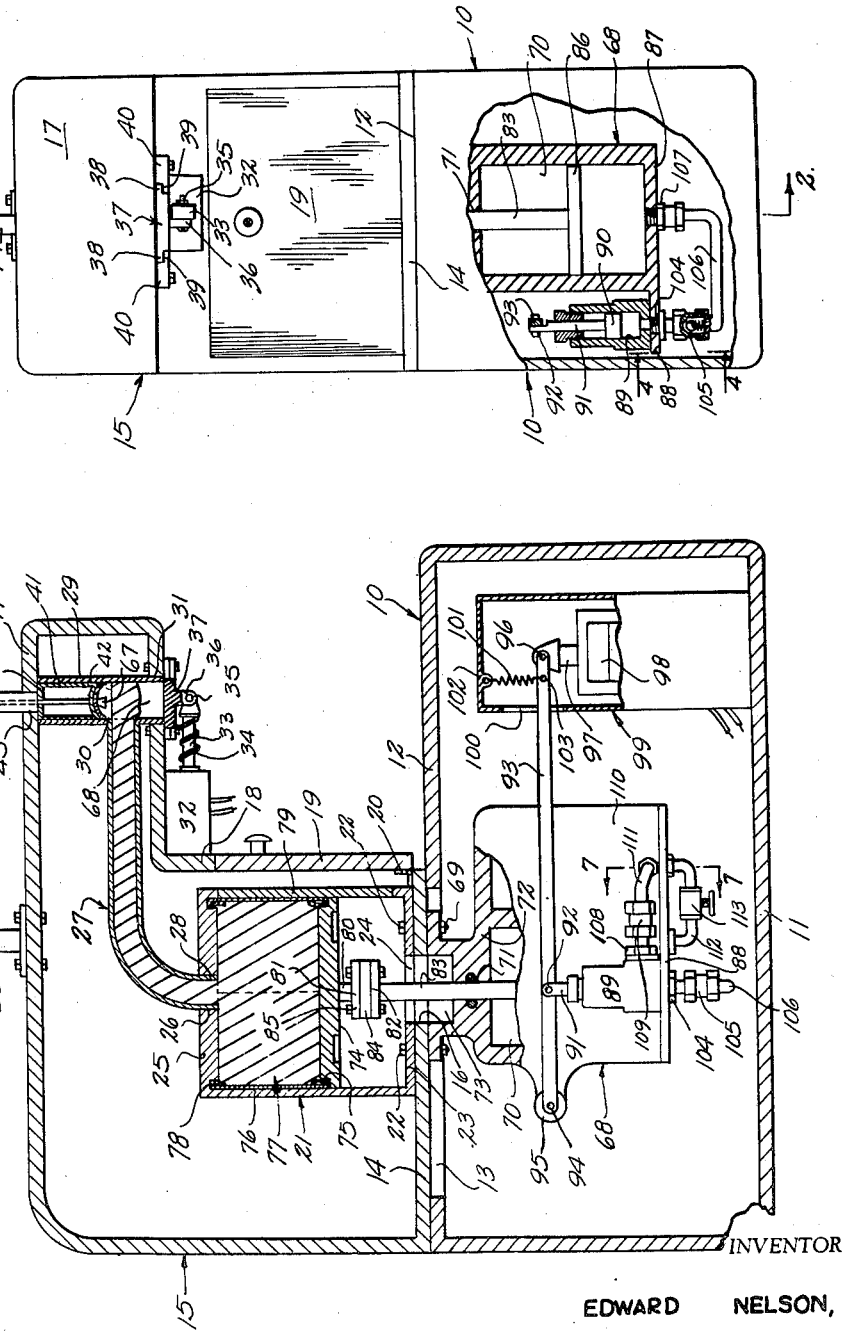
INVENTOR
EDWARD NELSON,
BY
*McMorrow, Berman + Davidson*
ATTORNEYS Sept. 18, 1951     E. NELSON     2,568,293
ICE CREAM DISPENSING MACHINE
Filed May 19, 1950     2 Sheets-Sheet 2
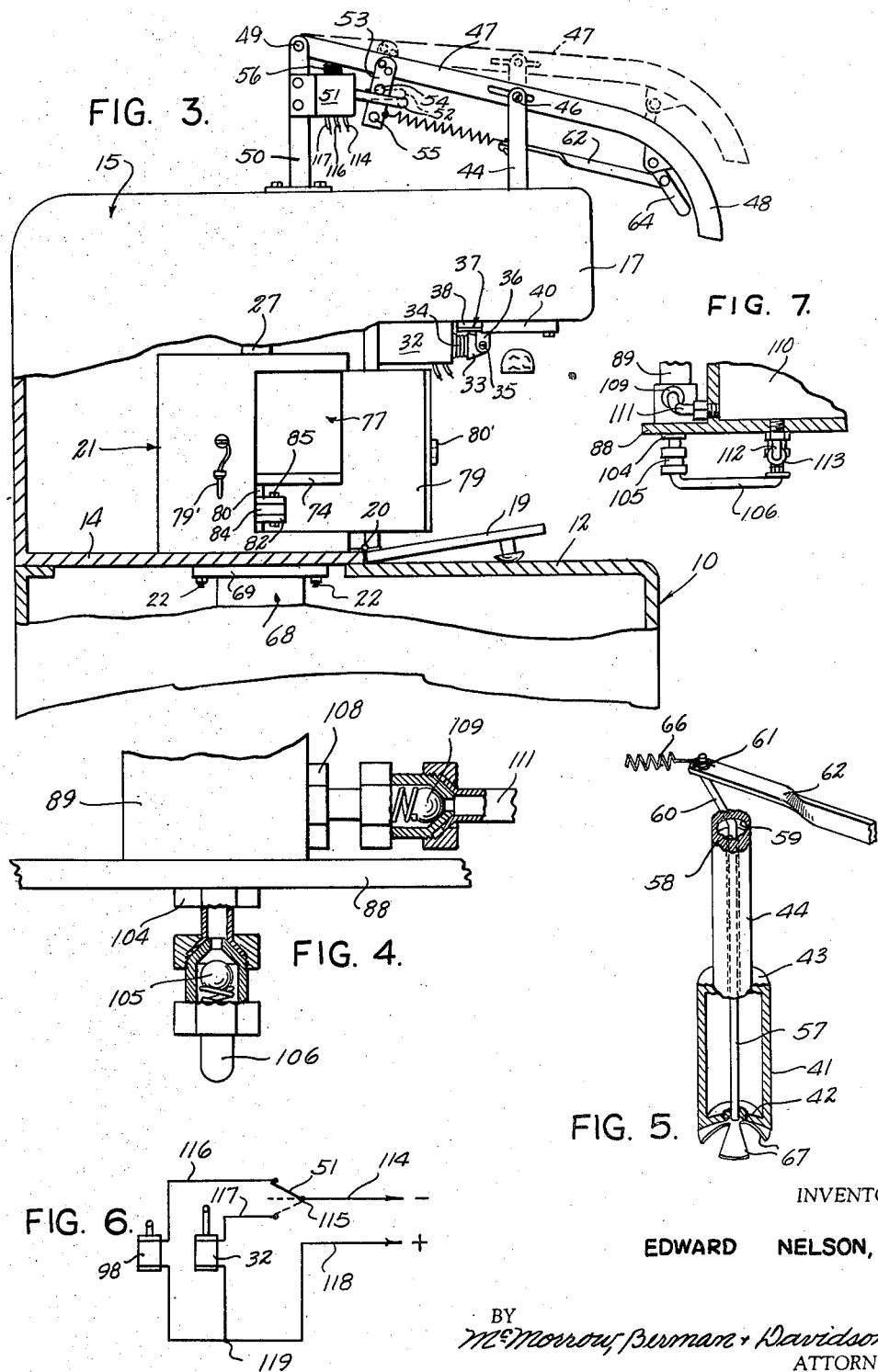
INVENTOR
EDWARD NELSON,
BY
ATTORNEYS Patented Sept. 18, 1951

2,568,293

UNITED STATES PATENT OFFICE 2,568,293

ICE-CREAM DISPENSING MACHINE

Edward Nelson, Sycamore, Ill.

Application May 19, 1950, Serial No. 162,852

5 Claims. (Cl. 107—14)

1

My invention relates to an ice cream dispensing machine.

A primary object of the invention is to provide a machine for dispensing ice cream from commercial bulk containers into cones or dishes.

A further object is to provide a machine of the above-mentioned character which is highly simplified, reliable and positive in operation, sturdy and durable in construction, and relatively cheap to manufacture.

A still further object of the invention is to provide an ice cream dispensing machine including manually controlled hydraulic means for compressing a commercial cardboard bulk container of ice cream to force the ice cream out of the same and into a dispensing chamber, together with manually operable means for ejecting a portion of the ice cream from the dispensing chamber into an ice cream cone, dish or the like.

A further object is to provide a dispensing machine of the above-mentioned character which is sanitary.

Other objects and advantages of the invention will be apparent during the course of the following description.

In the accompanying drawings forming a part of this application, and in which like numerals are employed to designate like parts throughout the same:

Figure 1 is a side elevational view of an ice cream dispensing machine embodying my invention;

Figure 2 is a central, vertical, longitudinal, sectional view taken on line 2—2 of Figure 1, parts in elevation;

Figure 3 is a fragmentary side elevational view of the machine taken at right angles to Figure 1, and showing parts of the machine in different operative positions, parts in section;

Figure 4 is an enlarged, fragmentary, vertical, sectional view taken on line 4—4 of Figure 1;

Figure 5 is an enlarged, fragmentary, perspective view of an ejecting piston and associated elements, parts in section;

Figure 6 is a diagrammatic view of an electrical circuit embodied in the dispensing machine; and Figure 7 is a fragmentary vertical sectional view taken on line 7—7 of Figure 2.

In the drawings, where, for the purpose of illustration, is shown a preferred embodiment of the invention, the numeral 10 designates a lower casing section or housing including a flat bottom or base 11 and horizontal, flat top 12. The top

2

12 of the lower casing section 10 is provided with a large opening 13, and the flat, horizontal bottom 14 of an upper casing section 15 is mounted upon the top 12 and extends over the opening 13, as shown. The bottom 14 is provided with an opening 16 which registers with the opening 13. The upper casing section 15 extends above the lower casing section 10 for a substantial distance, and includes a top, elongated, horizontal portion or casing extension 17 extending laterally beyond one vertical side 18 of the upper casing section, such vertical side being provided with a vertically swingable access door 19 having its bottom hingedly connected, as at 20, to the adjacent side of the bottom 14. As viewed in Figure 2, the lower casing section 10 is somewhat elongated and substantially longer than the main body portion of the upper casing section 15. The upper, elongated, horizontal casing extension 17 projects over the top 12 of the lower casing section and is spaced vertically above the same. As shown in Figure 1, the upper and lower casing sections 15 and 10 are preferably of the same width, although their width may vary, if desired. It should be understood that the casing sections 10 and 15 merely constitute support and housing means for the essential elements of the invention, and the casing sections may vary in shape, size and construction, as desired.

A large, vertically disposed cylinder 21 is mounted within the upper casing section 15 and rigidly secured to the flat bottom 14 by bolts 22, or the like. The cylinder 21 includes a flat bottom 23 having a central opening 24 which registers with the opening 16 in assembly. The cylinder 21 further includes an integral, flat top or head 25 having a central opening 26 leading into the interior of the cylinder. An elongated ice cream conveyor tube or pipe 27 has a depending extension or arm 28 rigidly secured within the opening 26 and forming a liquid-tight joint with the head 25. The remainder of the conveyor tube 27 is horizontally disposed and extends into the horizontal casing extension 17, and has its outer end rigidly secured to and leading into a vertical ice cream ejector sleeve or cylinder 29 near the lower end of such cylinder, as shown at 30. The vertical ejector cylinder 29 is arranged at right angles to the conveyor tube 27 and extends vertically across the upper casing extension 17 near the outer end of such extension. The bottom end of the ejector cylinder 29 is rigidly anchored within an opening 31 formed in the bottom of the casing extension 17, Figure 2. The joint 30 between the conveyor tube 27 and ejector cylinder 29 is liquid tight, and the tube 27 communicates with the interior of the cylinder 29 near its bottom end, as shown.

An electrical solenoid 32 is suitably rigidly secured to the vertical side 18 adjacent to the bottom of the casing extension 17, and includes a horizontal, reciprocatory core or plunger rod 33, biased outwardly or to the right, Figure 2, by means of a compressible coil spring 34 mounted thereon. The solenoid core or plunger rod 33 extends adjacent to the bottom end of the ejector cylinder 29 which is open, and is connected, as at 35, with a depending, apertured lug 36 of a flat, horizontal slide plate or valve element 37 having opposed, parallel, longitudinal, lateral flanges 38 integral therewith and slidably engaging in parallel grooves or recesses 39 formed in the inner, opposed sides of parallel, spaced guide bars or rails 40 which are rigidly secured to the bottom of the casing extension 17 upon opposite sides of the vertical cylinder 29. The rails 40 are disposed upon opposite sides of the plunger rod 33 and parallel thereto, and the rails extend longitudinally of the casing extension 17 and tube 27, as shown. The slide plate 37 is adapted to completely cover the bottom open end of the ejector cylinder 29 when the plunger rod 33 is in the outermost position under the influence of the spring 34. When the solenoid 32 is energized, the core or plunger rod 33 is drawn inwardly or to the left, Figure 3, and the slide plate 37 is shifted from beneath the bottom end of the cylinder 29 for opening the same so that ice cream may be ejected from the bottom end of the cylinder 29. When the solenoid 32 is de-energized, the spring 34 returns the slide plate 37 automatically to its closed position, Figure 2, wherein it completely covers the open bottom end of the ejector cylinder 29.

Slidably mounted within the cylinder 29 for reciprocation is a vertically shiftable ice cream ejector piston 41 having a concave, preferably spherically rounded bottom end 42 and a flat top end 43 forming a stop. The piston 41 is carried by an elongated, vertical piston rod or bar 44 extending slidably through an opening 45 formed in the top of the casing extension 17. The piston rod 44 extends above the top of the casing extension 17 for a substantial distance, and has its top end pivotally connected, as at 46, with an elongated, generally horizontal, vertically swingable control lever 47, having a forward curved, depending handle extension 48 integral therewith and spaced longitudinally beyond the forward end of the casing extension 17 and above the top of the casing extension, as shown. The other end of the control lever 47 is pivotally connected, as at 49, with an upstanding vertical post 50 rigidly secured to the top of the upper casing section 15 and spaced laterally of the vertical piston rod 44, as shown. A suitable double-throw switch 51 is rigidly mounted upon the post 50 near and below the control lever 47, and this switch includes a vertically swingable pin or actuator 52 having up-and-down, circuit closing positions, Figures 2 and 3, and a neutral or horizontal position shown dotted in Figure 3. The switch actuator 52 extends below the lever 47 and generally parallel thereto, and a depending plate or bar 53 is rigidly secured to one side of the lever 47 and extends adjacent to one side of the switch actuator or pin 52. A pair of vertically spaced, transverse, horizontal trip pins 54 and 55 are rigidly secured to the depending plate 53, and these trip pins straddle the switch actuator 52, as shown, for shifting the actuator upwardly and downwardly when the lever 47 is raised and lowered by its handle extension 48. In Figure 2, the lever 47 is shown in its uppermost position with the stop 43 engaging the top of the casing extension 17 to limit the upward movement of the lever. When the lever 47 is in this uppermost position, the trip pin 55 has swung the switch actuator 52 upwardly to one circuit-closing position. When the lever 47 is swung downwardly to its lowermost position, Figure 3, the upper trip pin 54 shifts the actuator 52 to its lower, circuit-closing position, the switch 51 being a double-throw switch.

A strong, compressible, bumper spring 56 is permanently secured to the top of the switch 51, and has its top end freely disposed, as shown. This spring 56 is designed to normally maintain the control lever 47 in such a position that the switch actuator or pin 52 will be in its neutral or horizontal position shown dotted in Figure 3, wherein no circuit will be closed by the switch. When the lever 47 is elevated to its position of Figure 2, the lever disengages the top of the spring 56, as shown, and when the lever is pulled downwardly to its position of Figure 3, the spring 56 is compressed substantially solid. When the lever 47 is released from its lowermost position, the spring 56 returns it to the intermediate or neutral position for positioning the actuator 52 in the intermediate or neutral position.

The ejector piston 41 may be hollow, as shown, and provided in its concave bottom 42 and top 43 with central, axially aligned openings for rotatably receiving a central, vertical rod 57 which extends beyond the top end of the cylinder 41 and into a central, longitudinal opening 58 formed in the piston rod 44. At a point near its longitudinal center, the piston rod 44 is provided in its side wall with a circumferential slot 59 leading from the opening 58, and through which a lateral extension or arm 60 integral with the rod 57 is adapted to oscillate. The free end of the arm 60 is pivotally connected, as at 61, with one end of an elongated, horizontal link 62 extending below and parallel to the control lever 47. The forward end of the link 62 is pivotally connected at 63 to a depending trigger or lever 64 having its top end pivotally connected, as at 65, with the handle extension 48. A horizontal, retractile coil spring 66 has one end secured to the depending plate 53 near the bottom thereof and its opposite end secured to the inner or rear end of the horizontal link 62 for urging such link inwardly or to the left, Figure 2. When the handle extension 48 is grasped and the trigger 64 pulled toward it, the link 62 is shifted toward the extension 48 and stretches the spring 66. The arm 60 swings through the slot 59, and the rod 57 rotates in the opening 58. Whenever the trigger 64 is released, the spring 66 returns the link 62 and arm 60 to their positions illustrated in Figure 2. Rigidly secured to the bottom end of the rod 57 for rotation therewith when the trigger 64 is pulled and released are a plurality of radial, circumferentially spaced, concave slicing blades 67 disposed beneath the bottom end 42 of the piston 41 and slidably contacting such bottom end. An ejector chamber 68 is formed by the bottom portion of the cylinder 29 below the piston 41 and adjacent to the conveyor tube 27. When the slide plate 37 is pulled open by the solenoid 32, and the ejector piston 41 descends to eject ice cream from the chamber 68, the trigger 64 is squeezed and released for causing the slicing blade 67 to rotate with the rod 57. This shears the ice cream from the bottom of the piston 42, so that it drops freely as illustrated in Figure 3, from the open bottom end of the ejector cylinder 29 into a cone or dish which is held below the cylinder 29.

A hydraulic cylinder 68 is mounted within the lower casing section 10 adjacent to the large opening 13, and includes a top horizontal flange 69 disposed within the opening 13 and rigidly secured to the flat bottom 14 by the bolts 22, as shown. The hydraulic cylinder 68 has a main vertical bore or chamber 70 leading into a central, vertical, small bore 71 formed in the top 72 of the cylinder 68. The small bore 71 leads upwardly into a relatively wide recess or opening 73 formed centrally in the flange 69 and arranged in registration with the openings 16 and 24, Figure 2.

The openings 24, 16 and 73 form a deep cylindrical recess or opening, as shown. A substantially flat, wide, compressing cylinder or plunger 74 is slidably mounted within the cylinder 21 for vertical movement therein, and provided in its top face and peripheral edge with a marginal, annular groove or recess 75. This recess 75 is adapted to accommodate or receive the collapsible side wall 76 of a conventional, commercial, cardboard ice cream container 77. A companion annular groove or recess 78 is formed in the bottom face of the cylinder head 25 adjacent to the side wall of the cylinder 21, and this recess 78 likewise accommodates the collapsible side wall 76 of the cardboard ice cream container, as the same is collapsed by the upward movement of the plunger 74. The side wall of the cylinder 21 is provided with a horizontally swingable hinged section or door 79 extending for substantially the entire height of the cylinder 21, to facilitate changing the cardboard ice cream containers 77.

A short, depending rod or shaft 80 is rigidly secured centrally to the bottom of the plunger plate 74, and a coupling plate or disc 81 is rigidly secured to the bottom of the shaft 80. An opposed coupling element or disc 82 is rigidly secured to the top end of a vertical piston rod 83, and a fiber block or disc 84 is arranged between the coupling discs 81 and 82, all three discs being rigidly secured together by means of bolts 85, or the like. The fiber disc 84 is a poor conductor of heat and cold, and tends to prevent frosting of the piston rod 83 of the hydraulic cylinder 68, due to cold being conducted from the ice cream cylinder 21. The plunger plate 74 is adapted to travel from the bottom 23 of the cylinder 21 to its top or head 25 for forcing all of the ice cream from the collapsible cardboard container 77. When the plunger plate 74 is in the lowermost position adjacent to the bottom 23, the coupling discs 81 and 82 enter the recess formed by the openings 24, 16 and 73.

A reciprocatory piston or plunger 86 is slidably mounted within the hydraulic cylinder 68 and rigidly secured to the bottom end of the piston rod 83, Figure 4. The hydraulic cylinder 68 is provided near its bottom 87 with a horizontal, laterally extending support plate or platform 88, preferably formed integrally therewith, and rigidly secured to the top of the platform 88 is an upstanding, vertical pump cylinder 89 having a vertically reciprocatory piston or plunger 90 mounted therein. A vertical piston rod 91 is secured to the piston 90 and extends slidably through the top of the pump cylinder 89. The top end of the rod 90 is pivotally connected at 92 with an elongated, vertically swingable, horizontal link or lever 93 extending adjacent to one side of the hydraulic cylinder 68, as shown. The lever 93 extends beyond opposite sides of the pump cylinder 89, Figure 2, and has its rear end pivotally connected at 94 with an apertured lug 95 formed integrally with the cylinder 68. The forward end of the lever 93 is pivotally connected at 96 with the top end of a core plunger bar 97 of an electrical solenoid 98 mounted within the lower casing section 10 and spaced laterally of the hydraulic cylinder 68, Figure 2. The solenoid 98 has a housing or casing 99 provided in its side wall with a vertical slot 100 through which the vertically swingable lever 93 operates. A retractile coil spring 101 has its top end secured to the top 102 of the housing 99 and its bottom end secured at 103 to the lever 93 near its forward end. When the solenoid 98 is energized, the core or bar 97 draws the forward end of the lever 93 downwardly for depressing the piston 90 of the pump cylinder 89. When the solenoid 98 is deenergized, the spring 101 automatically elevates the forward end of the lever 93 and raises the piston 90.

A screw-threaded, tubular fitting or nipple 104 leads from the bottom end of the pump cylinder 89, and carries a downwardly opening, spring pressed ball check valve 105 for controlling the flow of hydraulic fluid from the bottom of the pump cylinder 89 into a substantially U-shaped conduit or tube 106. The other end of the conduit 106 is connected with a screw-threaded, tubular fitting or nipple 107 engaging in a central, screw-threaded opening formed in the bottom 87 of the hydraulic cylinder 68, Figure 4. Thus, when the piston 90 descends in the pump cylinder 89, the ball check valve 105 opens downwardly so that hydraulic fluid may pass through the conduit 106 and into the bottom of the cylinder 68 for elevating the plunger or piston 86. A tubular fitting or nipple 108 is mounted within the side wall of the pump cylinder 89 near its bottom end, Figures 2, and this fitting 108 carries an inwardly opening, spring pressed ball check valve 109. The check valve 109 controls the flow of hydraulic fluid from a container or reservoir 110 through a generally horizontal tube or conduit 111 into the bottom of the pump cylinder 89. One end of the conduit 111 is connected with the ball check valve 109, and its opposite end leads into the bottom of the reservoir 110, which is preferably integrally secured to the side wall of the hydraulic cylinder 68, Figure 2. The arrangement is such that when the piston 90 is elevated within the pump cylinder 89, the ball check valve 109 will be sucked open so that hydraulic fluid may flow from the reservoir 110 into the bottom of the pump cylinder 89. When the piston 90 descends, the check valve 109 will close and the check valve 105 will open, as previously stated.

A substantially U-shaped by-pass or bleed line 112 leads from the bottom of the hydraulic cylinder 68 into the bottom of the reservoir 110. The by-pass 112 has a manually operated stop cock 113 connected in it, so that after repeated reciprocations of the pump piston 90 have substantially filled the hydraulic cylinder 68 with fluid, such fluid may be drained or by-passed back into the reservoir 110. The pump cylinder 89 has a very small volume compared to the volume of the cylinder 68, so that a great many reciprocations of the piston 90 are required before the cylinder 68 is filled and its piston 86 travels to the top of its stroke. Accordingly, the upward movement of the piston 86 and plunger plate 74 will be extremely gradual, as the piston 90 reciprocates, due to the action of the solenoid 98, lever 93 and associated elements.

As shown diagrammatically in Figure 6, the ice cream dispensing machine embodies a highly simplified electrical circuit, wherein current flows to the machine through a line or wire 114 which is electrically connected at 115 to the double throw switch 51. The switch 51 is adapted to connect the wire 114 alternately in series with either of two wires 116 and 117, having the solenoids 98 and 32 respectively connected in them. A line or wire 118 connected to a suitable source of electric current is connected at 119 with the wires 116 and 117, as shown, the wire 114 being also connected to said source of electric current. The switch 51 is actuated by the manually operated control arm 47 in the manner previously described, and the neutral and lowermost, circuit closing positions of the switch 51 are shown dotted in diagrammatic Figure 6.

The operation of the ice cream dispensing machine is as follows:

The doors 19 and 79 may be swung open, as shown in Figure 3, so that a full cardboard ice cream container 77 may be introduced into the cylinder 21. The doors 79 and 19 are now closed, there being suitable latch means provided for the hinged section or door 79 comprising a keeper 80' on the exterior of the door which receives a pin 79' dependingly carried by the exterior of the cylinder 21.

Assuming that current is flowing in the wires 114 and 118, and it is desired to fill a cone or dish held beneath the cylinder 29 with ice cream, the handle extension 48 is elevated until the top of the piston 41 engages the top of the casing extension 17, Figure 2. This movement of the control lever 47 shifts the switch actuator 52 to its elevated position for closing the circuit through the solenoid 98, Figure 6, and this solenoid will accordingly be momentarily energized until the control lever 47 is released or lowered. When the solenoid 98 is thus energized, its core 97 pulls the forward end of the lever 93 downwardly for lowering the piston 90 of the pump cylinder 89. This forces a small quantity of hydraulic fluid through the conduit 106 and into the bottom of the cylinder 68 below its piston 86 for elevating the same slightly. When the piston 86 is elevated, the plunger plate 74 will likewise be elevated the same amount. When this occurs, some of the ice cream in the container 77 is forced through the conveyor tube 27 and into the ejector chamber 68.

The control lever 47 is only elevated momentarily, for energizing the solenoid 98 and then released or swung downwardly to its position shown in Figure 3. If the lever 47 is merely released after it is elevated, it will return by gravity into engagement with the bumper spring 56 which will support it in the neutral position. In such neutral position, the double-throw switch 51 is likewise neutrally positioned, as shown dotted in Figure 6, so that no circuit is closed through either of the solenoids 32 or 98. When the control lever 47 is swung downwardly to its position of Figure 3, the switch actuator 52 is likewise swung downwardly, so that the switch 51 is positioned or actuated for closing the circuit through the solenoid 32, as shown dotted in Figure 6. When this occurs, the solenoid 32 is energized and the core or plunger bar 33 is shifted to the left, Figure 3, for withdrawing the slide plate 37 from beneath the bottom open end of the ejector cylinder 29. As long as the control lever 47 is held in the lowered position, the solenoid 32 will remain energized and the bottom of the cylinder 29 will be uncovered. When the control lever 47 reaches the full extent of its downward travel, the ejector piston 41 will have forced the ice cream in the chamber 68 through the bottom of the cylinder 29 and into the adjacent cone, dish or the like. While the control lever is still in the lowered position, the trigger 64 is squeezed or pulled toward the handle extension 48 for rotating the slicing blade 67 to shear the ice cream from the bottom of the ejector piston 41. Since the bottom 42 and blade 67 are concave and spherically rounded, the mass of ice cream ejected from the chamber 68 will have its top spherically rounded like the usual ice cream ball dispensed with the usual hand dipper. When the ice cream has been completely dispensed, as described above, the control lever 47 is released and the bumper spring 56 will return it automatically to the neutral position shown dotted in Figure 3. When this occurs, the circuit through the solenoid 32 will be opened and the coil spring 34 will return the slide plate or valve element 37 to the closed position automatically.

The above-described operation of momentarily raising the control lever 47 and then pulling it downwardly may be repeated until all of the ice cream is pressed out of the cardboard container 77 and the same is fully collapsed or compressed substantially flat. In this regard, as the container 77 is progressively collapsed or flattened, the material forming its side wall 76 will tend to roll or fold into the annular grooves 75 and 78. The empty container 77 is removed from the machine through the doors 79 and 19, so that a new container of ice cream may be introduced into the cylinder 21.

The upper casing section 15 is preferably refrigerated or cooled by any conventional means, not shown, and the upper casing section encloses all parts of the machine which contact or hold the ice cream. If desired, the upper casing section 15 need not contain any refrigerating means, and the side walls of the cylinders 21 and 29, as well as the side wall of the tube 27, may be covered with a suitable heat insulating material. In installations where the ice cream is dispensed very rapidly from the machine, it may not be necessary to refrigerate the upper casing section 15.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. An ice cream dispensing machine comprising a support, an ice cream cylinder mounted upon the support and adapted to hold a compressible container of ice cream, the cylinder having an outlet opening, a piston slidably mounted within the cylinder for compressing the ice cream container to force ice cream through said outlet opening, a conveyor tube connected with the ice cream cylinder and leading from said outlet opening, an ejector cylinder secured to the support and spaced from the ice cream cylinder and connected with the conveyor tube, the conveyor tube leading into the side of the ejector cylinder near one end of such cylinder, one end of the ejector cylinder being open, a slide plate for covering the open end of the ejector cylinder and being shiftable to an open position, an ejector piston mounted within the ejector cylinder for forcing ice cream from the open end of the ejector cylinder when the slide plate is in the open position, manually operated means connected with the ejector piston to reciprocate it, electrical means connected with the slide plate and manually operated means and actuated by the manually operated means for opening the slide plate when the ejector piston moves toward the open end of the ejector cylinder, hydraulic means mounted upon the support and connected with the piston of the ice cream cylinder for shifting it in a direction to compress the container of ice cream, and separate electrical means connected with said hydraulic means for actuating the hydraulic means and operated by the manually operated means when such means shifts the ejector piston away from the open end of the ejector cylinder.

2. An ice cream dispensing machine comprising a support, an ice cream cylinder mounted upon the support and adapted to hold a compressible container of ice cream and having an outlet opening, an ice cream conveyor tube connected with the outlet opening of the ice cream cylinder and leading from the outlet opening, a substantially vertical ejector cylinder secured to the support and spaced from the ice cream cylinder and connected with the conveyor tube, the conveyor tube leading into the interior of the ejector cylinder, the lower end of the ejector cylinder being open, a substantially horizontal movable slide plate covering the lower open end of the ejector cylinder, an electrical solenoid secured to the support adjacent to the slide plate and including a core connected with the slide plate to shift it from a closed to an open position, a reciprocatory ejector piston mounted within the ejector cylinder for forcing a quantity of ice cream from the lower open end of the ejector cylinder when the slide plate is in the open position, a manually operated lever connected with the ejector piston for reciprocating it, hydraulic means mounted upon the support and connected with the piston of the ice cream cylinder for moving it in one direction to compress the container of ice cream, an electrical solenoid mounted upon the support near the hydraulic means and including a core connected with the hydraulic means to actuate the hydraulic means, and a double-throw switch positioned adjacent to the manually operated lever and operated by the lever for energizing the first-named solenoid to open the slide plate when the ejector cylinder is shifted toward the slide plate by the lever, the double-throw switch being actuated by the lever for energizing the second-named solenoid when the lever shifts the ejector piston away from the slide plate.

3. An ice cream dispensing machine comprising a support, an ice cream cylinder mounted upon the support and having an outlet opening, an ice cream compressing piston mounted within the cylinder for forcing ice cream through said outlet opening, an elongated conveyor tube connected with the outlet opening of the cylinder and leading therefrom, an ejector cylinder mounted upon the support and spaced from the ice cream cylinder and having an open end and being connected with the ejector tube, a slide plate for covering and uncovering the open end of the ejector cylinder, a first solenoid mounted upon the support near the slide plate and including a core connected with the slide plate to shift it to the uncovering position, an ejector piston mounted within the ejector cylinder for movement toward and away from the slide plate and adapted to force ice cream through the open end of the ejector cylinder when the slide plate is in the uncovering position, a manually operated control lever secured to the support and connected with the ejector piston for shifting it toward and away from the slide plate, a hydraulic cylinder mounted upon the support in axial alignment with the ice cream cylinder and having a piston directly connected to the piston of the ice cream cylinder for shifting the piston of the ice cream cylinder toward said outlet opening, pump means secured to the hydraulic cylinder for moving the piston of the hydraulic cylinder in a step-by-step manner, a second solenoid mounted upon the support near the pump means and including a core connected with the pump means for actuating the same, and a double-throw switch positioned near said manually operated lever and actuated by the lever for energizing the first solenoid when the lever shifts the ejector piston toward the slide plate, the switch being actuated by the lever to energize the second solenoid when the lever shifts the ejector piston away from the slide plate.

4. An ice cream dispensing machine comprising a support, an ice cream cylinder mounted upon the support for holding a compressible container of ice cream and having an outlet opening, a piston mounted within the ice cream cylinder for compressing the container of ice cream, a conveyor tube connected with the outlet opening of the ice cream cylinder and leading therefrom, a substantially vertical ejector cylinder secured to the support and spaced from the ice cream cylinder, the conveyor tube being connected with the side of the ejector cylinder, the bottom end of the ejector cylinder being open, movable closure means connected with the support adjacent to the open bottom end of the ejector cylinder and adapted to cover and uncover said open bottom end, an ejector piston mounted within the ejector cylinder for reciprocation and adapted to force ice cream through the bottom open end of the ejector cylinder when said closure means uncovers the bottom open end, a manually operated control lever connected with the ejector piston for reciprocating it, rotary slicing means carried by the bottom end of the ejector piston for shearing ice cream from the ejector piston, linkage means carried by the control lever and connected with said rotary slicing means to operate the slicing means, hydraulic means mounted upon the support and connected with the piston of the ice cream cylinder for moving such piston in the direction for compressing the container of ice cream, and electrical means mounted upon the support and connected with the hydraulic means, movable closure means and manually operated lever, said electrical means being actuated by movement of the manually operated lever in one direction for operating the hydraulic means, said electrical means being actuated by movement of the lever in an opposite direction for operating said movable closure means.

5. In an ice cream dispensing machine, a support, a substantially vertical ejector cylinder secured to the support and having its bottom end open, a substantially horizontal slide plate positioned adjacent to the bottom open end of the ejector cylinder for covering and uncovering such bottom open end, an electrical solenoid secured to the support near the slide plate and including a core connected with the slide plate for shifting the slide plate to and from open and closed positions, an ejector piston slidably mounted within the ejector cylinder for movement toward and away from the bottom open end and including a concave bottom end, a substantially vertical piston rod secured to the top of the ejector piston and extending above the top of the support, a generally horizontal vertically swingable operating lever having one end pivotally secured to the support and a free end adapted to serve as a handle, the top end of the piston rod being pivotally connected with the operating lever between the ends of the operating lever, the piston rod and ejector piston having axial openings, a rod rotatably mounted within the axial openings, concave slicing knives positioned adjacent to the concave bottom end of the piston and secured to the rotatable rod and adapted to shear ice cream from the bottom of the piston, the side of the piston rod being provided with a slot communicating with the axial opening of the piston rod, a transverse crank arm secured to the top end of said rotatable rod and extending through said slot, lever means connected with the crank arm and with the control lever near the free end of the control lever for swinging the crank arm and turning the rotatable rod, a switch positioned adjacent to the control lever and actuated by such lever when the ejector piston is shifted toward the slide plate for energizing the solenoid, and means mounted upon the support and connected with the ejector cylinder for introducing ice cream into the ejector cylinder below the ejector piston.

EDWARD NELSON.

REFERENCES CITED

The following references are of record in the file of this patent:

UNITED STATES PATENTS

| Number | Name | Date |
|---|---|---|
| 1,577,241 | Ajonello et al. | Mar. 16, 1926 |
| 2,037,724 | Jacobs et al. | Apr. 21, 1936 |
| 2,536,649 | Lindsey | Jan. 2, 1951 |